Figure 1:
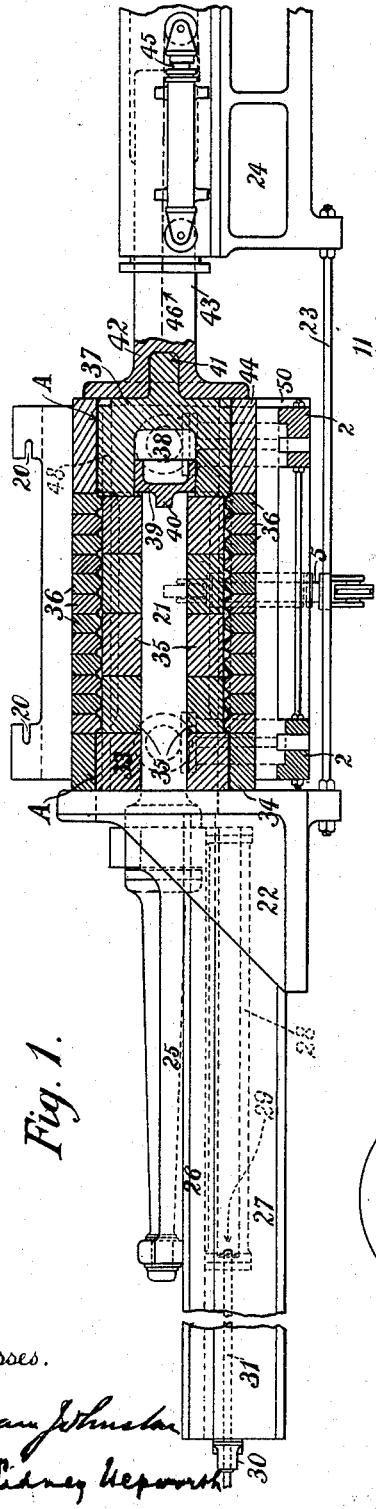

No. 743,192. PATENTED NOV. 3, 1903.
W. RAINFORTH.
APPARATUS FOR THE MANUFACTURE OF CORRUGATED FURNACES.
APPLICATION FILED APR. 23, 1902.
NO MODEL. 6 SHEETS—SHEET 1.

Witnesses.
Inventor.
William Rainforth

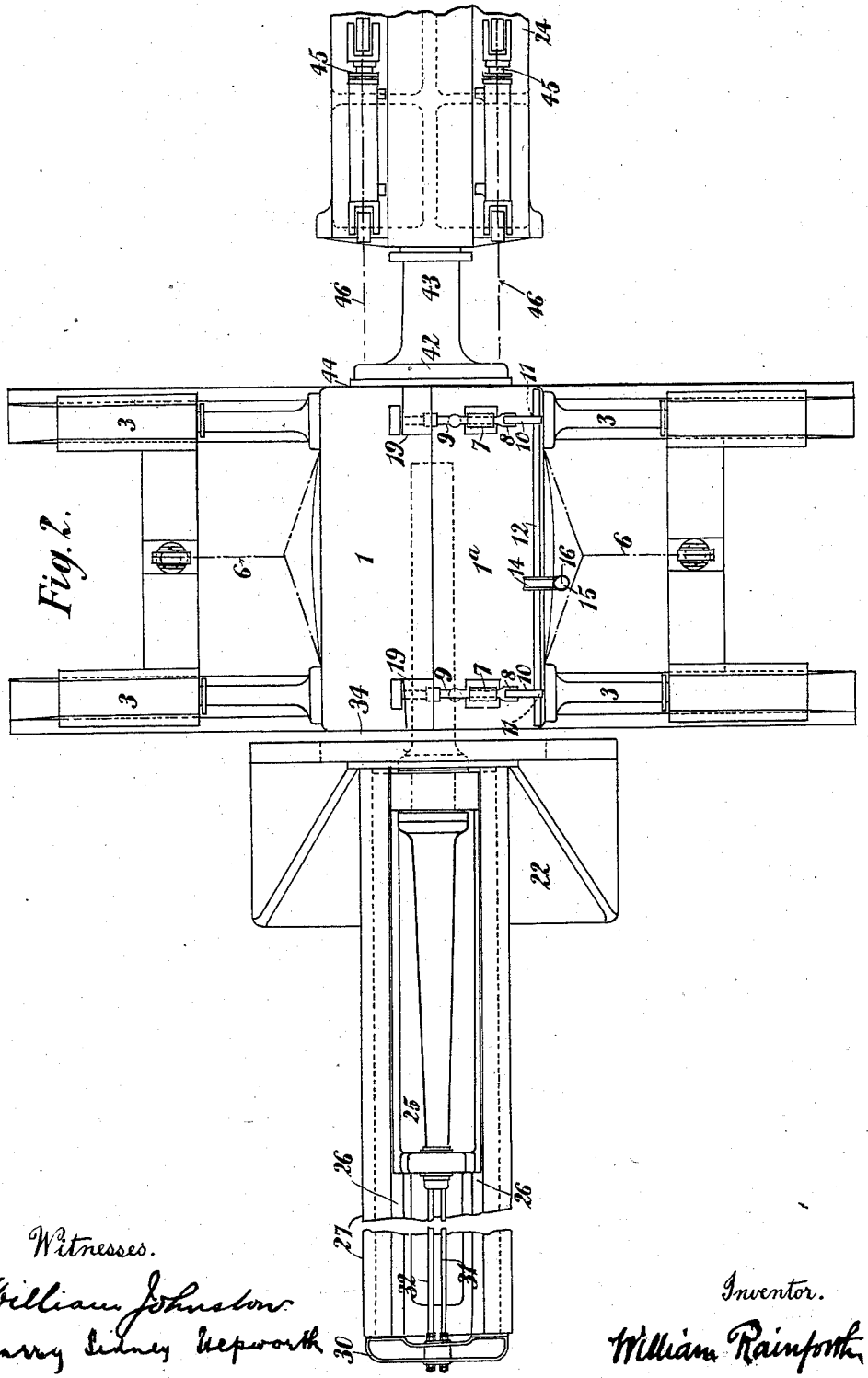

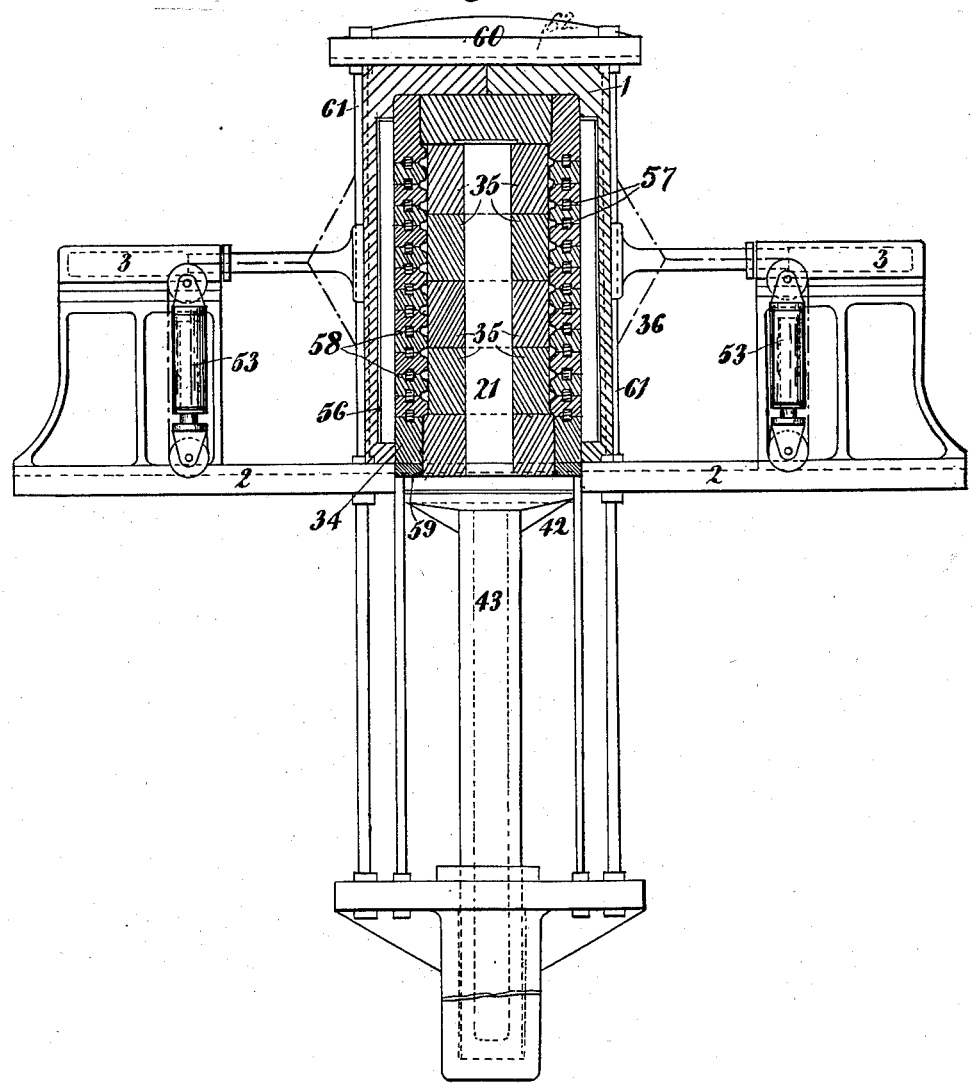

No. 743,192. PATENTED NOV. 3, 1903.
W. RAINFORTH.
APPARATUS FOR THE MANUFACTURE OF CORRUGATED FURNACES.
APPLICATION FILED APR. 23, 1902.
NO MODEL. 6 SHEETS—SHEET 4.
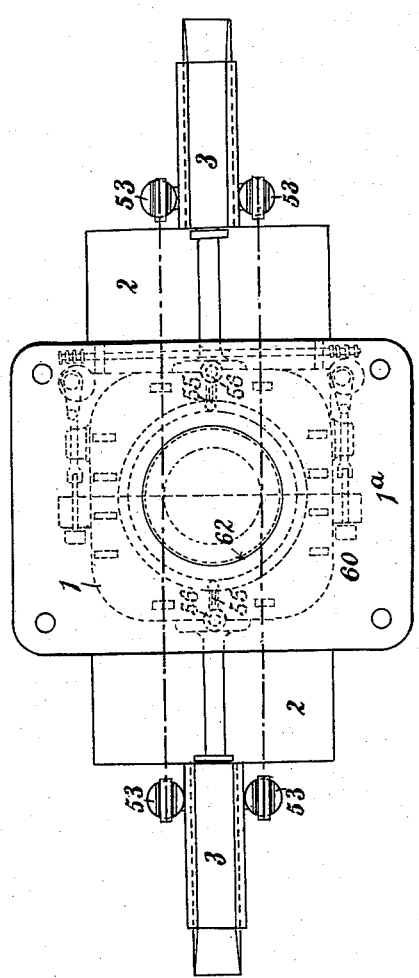
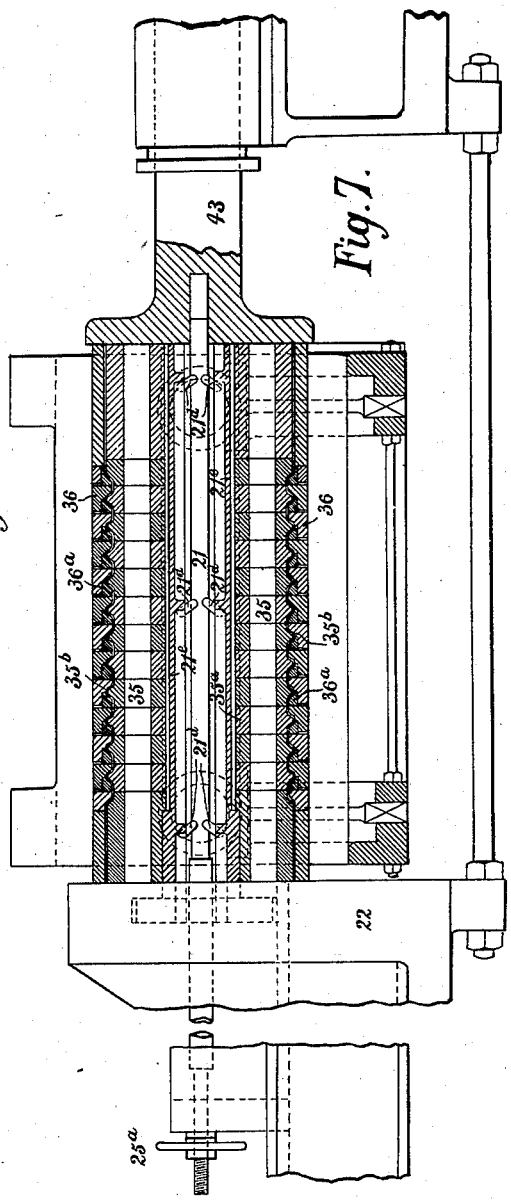
Witnesses.
William Johnston
Harry Sidney Hepworth
Inventor.
William Rainforth No. 743,192. PATENTED NOV. 3, 1903.
W. RAINFORTH.
APPARATUS FOR THE MANUFACTURE OF CORRUGATED FURNACES.
APPLICATION FILED APR. 23, 1902.
NO MODEL. 6 SHEETS—SHEET 5.
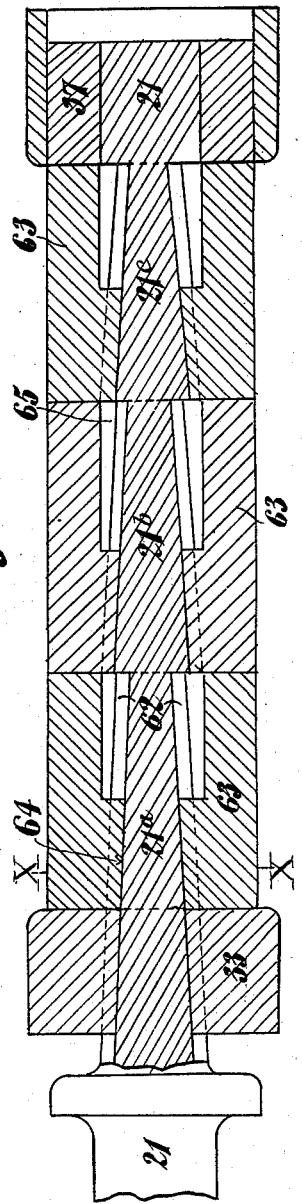
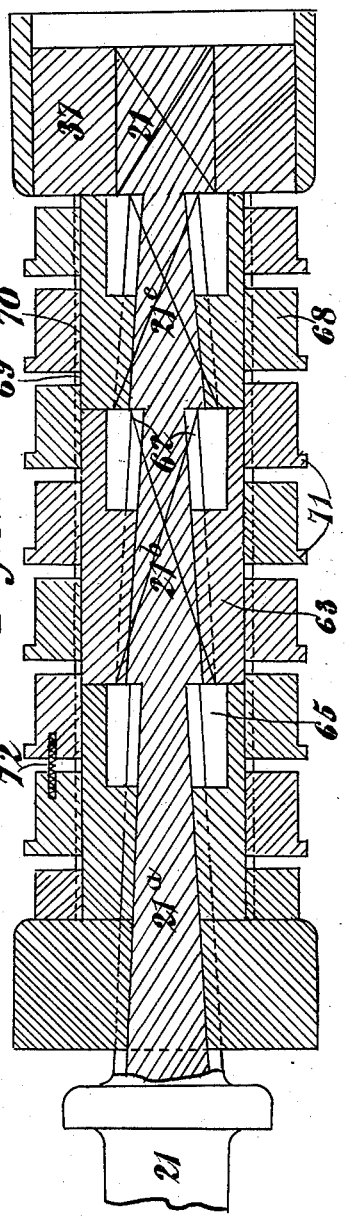
Witnesses.
William Johnston
Harry Sidney Hepworth
Inventor.
William Rainforth No. 743,192. PATENTED NOV. 3, 1903.
W. RAINFORTH.
APPARATUS FOR THE MANUFACTURE OF CORRUGATED FURNACES.
APPLICATION FILED APR. 23, 1902.
NO MODEL. 6 SHEETS—SHEET 6.
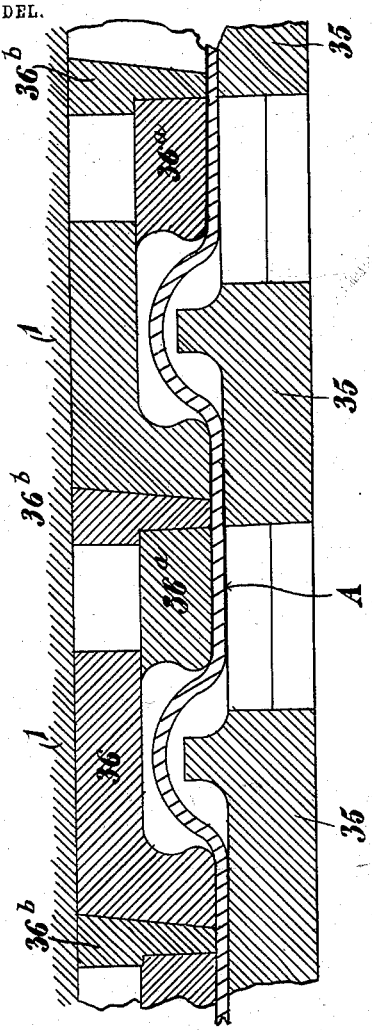
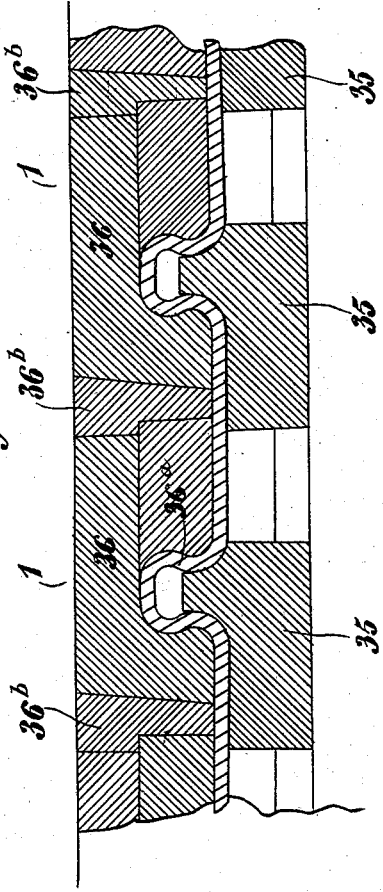
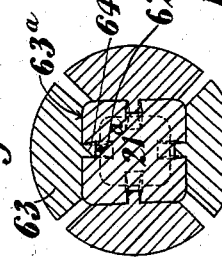
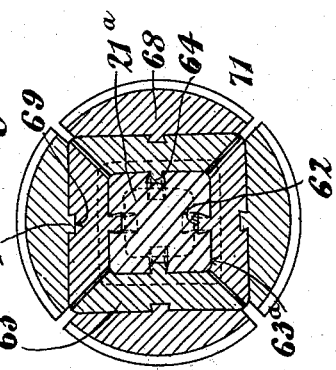
Witnesses.
William Johnston
Harry Sidney Hepworth
Inventor.
William Rainforth No. 743,192. Patented November 3, 1903.

UNITED STATES PATENT OFFICE.

WILLIAM RAINFORTH, OF UPPER ARMLEY, LEEDS, ENGLAND.

APPARATUS FOR THE MANUFACTURE OF CORRUGATED FURNACES.

SPECIFICATION forming part of Letters Patent No. 743,192, dated November 3, 1903.

Application filed April 23, 1902. Serial No. 104,399. (No model.)

*To all whom it may concern:*

Be it known that I, WILLIAM RAINFORTH, a subject of the King of Great Britain and Ireland, residing at Upper Armley, Leeds, in the county of York, England, have invented a new and useful Improved Apparatus for the Manufacture of Corrugated Furnaces, (for which I have made application for Letters Patent in Great Britain under No. 19,485 and date September 30, 1901, in France under No. 309,088 and date March 29, 1902, and in Belgium under No. 129,182 and date March 29, 1902,) of which the following is a specification.

This invention relates to means for the manufacture of steam-boiler furnaces of the class whose walls are of a longitudinal sectional form resembling arch-like outward projections or inward projections connected by intervening portions inwardly curved or otherwise formed. Many varieties of such furnaces have been constructed and proposed to be constructed, in some cases by rolling and in some cases by swaging by means of a steam-hammer or hydraulic or other press in a manner to impart what have been known as "corrugations" to the metal, which has been previously or subsequently brought to the general form of a furnace or flue; but the methods and means heretofore usually employed have not been such as to result in the production commercially of furnaces of the kinds referred to having bends or curves as pronounced as those I contemplate, there being in practice—as, for example, in a rolling-mill—a tendency to detrimental local thinning of the wall of the furnace under treatment. Thus, for instance, as is well known, it is practically impossible to produce a literally sharp section in a furnace by rolling, the sharpness of any section being governed by the thickness of the metal used.

Now according to this invention in order to produce a furnace with pronounced bends or curves in its wall the desired bends or curves are partially formed by a corrugating process and afterward the furnace is subjected to endwise pressure in such a manner that there is an appreciable shortening of the furnace, and the formation of the desired pronounced bends or curves is completed without undue stress or thinning of the metal. The preliminary corrugating process may conveniently be effected by rolling, as well understood, (although I do not limit myself to rolling,) and the completion of the pronounced bends or curves by pressure endwise of the furnace is effected by the use of hydraulic or other suitable pressing apparatus, in conjunction with a mandrel, rings made in parts to serve as dies, and suitable guiding and confining means.

The following are features of apparatus according to my invention (which can be variously constructed) for carrying into effect my above-described process—that is to say, first, a series of rings or segments of rings adapted to be located externally or internally (or both) in the corrugations of a furnace to be dealt with and the contours of which rings or segments depend upon the section of furnace it is desired to produce; second, an enveloping cylinder or chamber for retaining the external ring-segments in their places circumferentially, while nevertheless leaving them free to move lengthwise of the furnace, or any equivalent means for maintaining such rings in position circumferentially, while nevertheless permitting of the said movement; third, a mandrel which may be made in one piece or in sections, so as to be collapsible, with or without rings or segments of rings adapted to fit into the interior of the furnace to support the same and prevent deformation; fourth, sleeves adapted to surround the ends of the furnace and to serve for transmitting end pressure to the rings or segments which are located externally to the furnace; fifth, means for applying pressure in the direction of the length of the furnace in such a manner as to actuate the rings or segments and to impart to the metal the shape required.

The accompanying drawings illustrate apparatus for use in the production of furnaces according to this invention.

Figure 3:
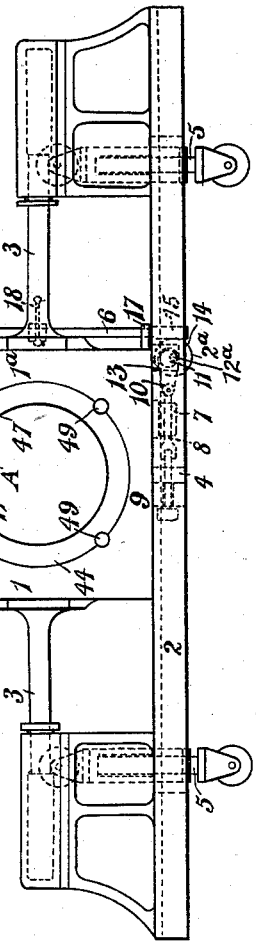
Figure 4:
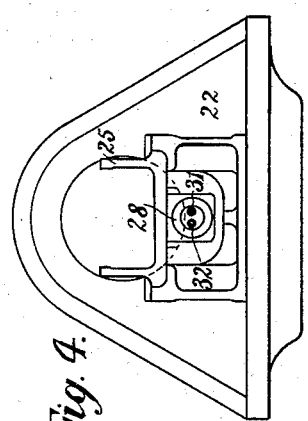

Figure 1 is a part-sectional elevation of one construction of apparatus for imparting to the furnace-wall its final form. Figs. 2 and 3 are respectively a plan and an end elevation of the same, and Fig. 4 is an elevation of a detached part of said apparatus. Figs. 5 and 6 are respectively a part-sectional elevation and a plan of a modified construction of the apparatus illustrated in Figs. 1 to 4. Fig. 7 is a sectional elevation of a modified construction of a form of mandrel which may be sometimes employed. Figs. 8 and 9 show in central longitudinal section and transverse section on the line X X, Fig. 8, respectively, a form of mandrel that is sometimes employed; and Fig. 10 is a diagrammatic view of a part thereof. Figs. 11 and 12 are similar views to Figs. 8 and 9 of a modified form of mandrel. Figs. 13 and 14 are detail views hereinafter referred to.

Similar characters refer to similar parts throughout the several views.

Referring to Figs. 1 to 4, 1 1$^a$ are two castings, formed in their opposite faces with semicircular recesses and so arranged that they can be moved toward and from each other and that when closed and connected together by suitable fastenings they constitute a die-casing of cylindrical form internally. Each half 1 1$^a$ of the cylindrical casing is mounted upon a suitable slide bed-plate 2 and is provided with single-acting hydraulic rams 3, whereby it can be moved toward its fellow.

4 4 are central stops in the slide bed-plate to prevent either half from being thrust beyond the center line.

5 5 are multiple rams, each connected by chains 6 to its respective half 11$^a$ of the casing.

One half, 1, of the casing is formed with lugs 7, in which slide rods 8, each having pivoted at one end a headed bolt 9 and at the other a link 10, formed as an eccentric-strap that encircles an eccentric 11.

12 12$^a$ are horizontal axles mounted in bracket-bearings 13 on the part 1$^a$ and each having two of the eccentrics 11 fixed to them, as shown in Figs. 2 and 3. Each axle 12 has also fixed to it a worm-wheel 14, operated by worms 15 upon a vertical shaft 16, mounted in bracket-bearings 17 and provided with a sliding handle or tommy-bar 18.

The part 1 of the casing is formed with lugs 19, having slots or grooves 20.

When the parts 1 1$^a$ of the casing are brought together, the bolts 9 can be swung into the slots 20 of the lugs 19 and the locking completed by a few turns of the handle or bar 18. The eccentrics are so arranged as to be on dead-centers when the bolts 9 are hard home on the lugs 19, thus forming a complete lock.

21 is an internal mandrel which is coaxial with the casing 1 1$^a$ when closed and passes through a fixed bed-bracket 22, (shown detached in end view in Fig. 1,) connected by tension-bolts 23 to a fixed bed-bracket 24 beyond the other end of the casing 1 1$^a$. The mandrel 21 is mounted upon a carriage 25, adapted to slide on suitable guides 26 on a fixed bed-plate 27, extending from the bed-bracket 22.

28 is a hydraulic cylinder secured to the carriage 25 and containing a fixed piston 29, connected to a cross-head 30 at the end of the bed-plate 27 by pipes 31 and 32, which communicate with opposite sides of the piston and permit the passage of liquid under pressure, through which it is controlled by a suitable double-acting valve, (not shown,) so that as the pressure liquid is admitted to the cylinder 28 on one side or the other of the fixed piston 29 the mandrel 21 will be advanced or retired.

33 is a ring which fits upon the neck of the mandrel 21, as shown, and is adapted to enter and fit into one of the plain end portions of the furnace-tube A, and 34 is an external segmental sleeve adapted to fit outside the said plain end portion of the furnace.

35 35 are rings which are fitted upon the mandrel 21 and are adapted to fit internally those portions of the furnace-tube A which are of smallest diameter. Four of these rings are shown, but there may be more or less.

36 36 are external segmental rings the internal contours of which are such that when they are pressed close together the internal contour of the die thus formed will correspond with the external contour of the furnace it is desired to produce.

37 is a cylindrical block adapted to enter into and fit the other plain end portion of the furnace-tube A, as shown. It is formed with a recess 38, adapted to receive a shoe 39, that is of larger diameter than the mandrel 21 and has a boss or stem 40, that fits into a recess in the end of the mandrel, as shown. The block 37 also has a boss or stem 41, that fits into a recess in the flanged head 42 of a powerful single-acting hydraulic ram 43, mounted upon the fixed bed-bracket 24. The flanged head 42 is of greater diameter than the block 37, and between its projecting edge portion and the adjacent segmental ring 36 is a segmental sleeve 44, which fits outside the other plain end of the furnace-tube A.

45 45 are multiple rams fixed upon the bed-plate and connected by suitable chain connections 46 46 to the ram 43.

The sleeves 34 and 44 and the rings 36 are preferably all divided into halves horizontally, the upper halves being formed with holes 47, so that they can be threaded upon bars or rods 48, so that they can be lifted and placed in position collectively. The lower halves are formed with recesses, and when they are in place rods 49, mounted at the ends in the bed-bracket 22 and a small bracket 50, take into the said recesses, and thus support the lower half-segments of the sleeves 34 and 44 and the rings 36.

In my improved manufacture of furnaces a tube of suitable metal, such as mild steel, is first corrugated by a rolling or other process to a formation approximating as nearly as practicable to the ultimate formation to be produced. The tube thus corrugated is then subjected to further treatment in apparatus such as hereinbefore described, so that the bent portions of the furnace-tube wall are further bent by the application of end pressure until the tube assumes the desired longitudinal form, the operation being as follows: The die-casing 1 1ᵃ being open and the mandrel 21 being drawn back through the bracket 22, the corrugated tube A is placed, by means of a crane or the like, upon the lower halves of the segmental rings 36 and sleeves 34 and 44, which are already in position on the rods 49, the number and spacing of the segments 36 corresponding to the intervening portions between the outwardly-projecting corrugations of the furnace-tube. The upper halves of the segmental rings 36 and sleeves 34 and 44, supported by the rods 48, are next dropped into position over the tube A, the mandrel 21 carrying the ring 33, and the internal rings 35 being at the same time moved into position by admitting water under pressure to the forward end of the cylinder 28. The two parts 1 1ᵃ of the cylindrical die-casing are now closed by means of the rams 3 and are fastened and locked together by swinging the bolts 9 into the slots 20 and operating the handle or tommy-bar 18. The stem of the shoe 39 is fitted into the end of the mandrel 21, and the ram 43, fitted with the cylindrical block 37, is by admitting water under pressure to the ram-cylinder pushed into the plain end portion of the tube A until the flanged head 42 of the ram abuts against the end of the sleeve 44, the segmental rings 36 then being spaced apart and the other parts being in the position shown in the drawings. On the admission of further pressure liquid to the cylinder of the ram 43 the block 37 and the sleeve 44, with the plain portion of the tube A between them, will be pushed forward. This will cause the sleeve 44 to come into contact with the end of the adjacent segmental ring 36, which will push before it into contact with the next ring 36, and so on until all the rings are in contact and form a complete die. The block 37 will also push in front of it the rings 35 successively, the said rings in the first instance being spaced apart upon the mandrel 21 to enable them to support the interior of the tube A throughout the operation of shortening it by end pressure without pushing the sleeve 34 out of the plain end of the tube A, which would permit deformation of that portion of the furnace-tube by the end pressure.

In some cases the sleeve 34 may be made up of inner and outer segmental rings, the outer one being so formed as to shut against the bracket 22 and support the plain part of the tube A, while allowing the inner portion and the adjacent ring 36 to slide relatively within it when the ram 43 overcomes the pressure in the cylinder 28. It will be understood that as the segmental rings 36 close they will bear against certain portions of the side walls of the outwardly-projecting corrugations already formed in the tube A by rolling and will force these portions of the side walls of the said corrugation closer together until the several segmental rings abut against each other, by which time the operation will be completed and the exterior of the flue-wall will have assumed the internal contour of the die formed by several segments. Fig. 13 shows in sections two adjacent segmental rings 36 in the relative positions they occupy before the end pressure is applied, and Fig. 14 is a similar view showing the two sections in contact after the pronounced bend or crinkle in the tube-wall has been formed by the application of the end pressure. Upon drawing back the mandrel 21, the ram 43, and the parts 1 and 1ᵃ and removing the upper halves of the rings 36 and sleeves 34 and 44 the completed furnace can be removed from the apparatus.

Of course in making a furnace with pronounced bends or crinkles in accordance with this invention it is necessary to operate upon a plain tube of greater length than is required to produce a furnace with corrugations such as have heretofore been practicable. The more pronounced the bends or crinkles the greater must be the length of the plain tube from which the furnace is to be manufactured.

Referring to Figs. 5 and 6, the cylindrical die-casing 1 1ᵃ is arranged upon slide bed-plates 2, so that when closed its axis is vertical, the mandrel 21 and the hydraulic ram 43 being arranged coaxially beneath it and the latter serving both to insert the mandrel and to apply the requisite end pressure to the tube A. The withdrawal of the mandrel is effected by multiple rams 53. The mandrel is formed with a flanged end that rests upon the flanged head 42 of the ram 43 and supports the rings 33 and 35 and the block 37, which latter being in this arrangement at the end of a tube A farthest from the ram 43 must be placed in position within the end of the tube A before the cylindrical die-casing 1 1ᵃ is closed. The parts 1 1ᵃ may in this case be guided at the top and may be fitted with rollers at the bottom. The halves of the segmental rings 36 and sleeves 34 and 44 are in this construction built up within each part of the die-casing 1 1ᵃ before it is closed and are supported therein by T-headed bolts 55, which engage in grooves 56, formed in the parts 1 1ᵃ. By this arrangement lateral movement of the segmental rings 36 and sleeves 34 and 44 relatively to one another is permitted. Each segmental ring 36 is formed with recesses 57, in which springs 58 are fitted, as shown, so as to keep the segmental rings 36 apart until the end pressure is applied.

59 is an annular plate suitably supported by the bed-plate of the machine beneath the sleeve 34, and 60 is a thrust-plate or an abutment head or block secured to bolts or rods 61, which pass through the bed-plate and are attached to the cylinder of the ram 43. The abutment head or block is formed with a central aperture 62, which is just large enough to allow the tube A after having been corrugated by rolling to be passed endwise through it. The tube A is placed upon the plate 59, as shown, and the cylindrical die-casing 1 1ª is then closed and fastened, as in the previous case. Water is then admitted to the cylinder of the ram 43, which is thereby forced upwardly, carrying the mandrel 21 with it. The flanged end of the mandrel comes into contact with the plate 59 and carries it and the parts resting on it upwardly through the die-casing 1 1ª until the sleeve 44 meets the abutment head or block. Further movement of the ram and mandrel then bends the bent parts of the tube-wall into more pronounced bends or crinkles, as in the previous case. In place of the inclosing cylinders 1 1ª I may clamp or bolt the end of the segmental-ring dies to one another, so as to maintain their circumferential continuity, and their relative lineal positions may be maintained by external guide or clamping bars, which leave the segmental rings free as to lateral movement to one another.

Where it is desired to use internal segments within the flue adapted to enter into the corrugated ridges projecting into the water-space, collapsible mandrels, as illustrated in Figs. 7 to 12, may be employed, by which the segmental pieces within the flue after being arranged around the body of the mandrel when at a small diameter, so as to be inserted within the flue, are then thrust outward by the expanding mandrel, so that the projecting ridges upon the segments are caused to enter into the recesses of the outwardly-projecting ridges or corrugations, and thus form an internal die or "former" within those corrugations, forming a gage as to the reduced pitch or internal size of ridges or projections, thus determining the extent to which the side walls of the hollow ridges or projections may be caused to approach each other. Eventually after the process of end compression has been completed by a collapse of the mandrel or of the body-segments supported by it the segments projecting into the hollow body of the outer projecting ridges or corrugations may be readily withdrawn.

A convenient form of a collapsible and expandible mandrel is shown in Fig. 7, in which the central mandrel-core 21 is adapted to be forced into and out of the main mandrel by a hand-wheel 25ª and screw on the said core. The mandrel-core 21 carries a series of toggle-levers 21ᵈ, pivoted upon it, the outer ends of the said toggle-levers being pivoted in segmental shoes 21ᵉ, running the whole length of the mandrel, such shoes having an inward-and-outward movement relatively to the core 21, always maintaining their parallel position to the axis of the core. Upon these segmental shoes 21ᵉ are fitted segmental rings 35, secured to the shoes 21ᵉ by dovetailed tenons 35ª, sliding in a longitudinal dovetailed groove in the faces of said shoes 21ᵉ, so that the segments 35 are free to move laterally to one another, but are held suspended or attached in all positions to the shoes 21ᵉ. The exterior periphery of the ring-segments 35 may now be provided with projecting ridges 35ᵇ, adapted to enter into the hollow of the outwardly-projecting ridges or corrugations of the flue, and may be thrust outwardly into their desired positions by the longitudinal movement of the core 21 by means of the hand-wheel and screw 25ª relatively to the shoes 21ᵉ, which are prevented from partaking of the longitudinal movement of the mandrel-core 21. The toggle-levers 21ᵈ are thus brought more perpendicular to the axis of the mandrel-core 21 and thrust out the shoes 21ᵉ and the ring-segments 35 to fill up the interior of the flue. By the reversal of the movement of the core 21 the shoes 21ᵉ and the segmental rings 35 will collapse toward the axis, and may thus easily be withdrawn after the completion of the end compression of the ridge corrugations of the flue, as hereinabove described. In Fig. 7 also is shown a modification of the outer segment 36, which heretofore has been described as lying between and forming by the contour of their conjoined recesses the desired sharp section of the ridges of the corrugated flue. In this case the recess for the ridge is in the center of each segment 36, and one side wall of that recess is formed by a small sliding auxiliary segment 36ª.

Referring to Figs. 8, 9, and 10, 21 is a mandrel of rectangular section with rounded corners and comprising a number of integral similar portions 21ª 21ᵇ 21ᶜ, each of which decreases in cross-sectional area from one end to the other, where its smaller end joins the larger end of the next portion, and so on. The inclined faces of these tapering portions are formed with longitudinal dovetail grooves 62, and there rests upon each such inclined face a correspondingly-inclined portion 63ª of a segment 63 of a ring or sleeve. The portions 63ª are formed with dovetail longitudinal ribs 64, which fit in the grooves 62, and the segments are recessed or cut away internally at 65, so that the mandrel 21 may be moved relatively to them in longitudinal directions, and thus cause them to expand for the purpose of supporting the furnace-wall internally or to collapse or contract, so as to facilitate their insertion and removal from the furnace-tube.

In some cases the contiguous parts of the several segments of a ring or sleeve may be formed, as represented diagrammatically in Fig. 10, with alternating recesses of grooves 66 and projections 67, the projections on the one taking into the recesses or grooves in the other for the purpose of distributing circumferentially the clearance between the segments when expanded, and thus preventing a considerable length of the wall of the furnace in a plane containing its axis being unsupported.

Figs. 11 and 12 are similar views to Figs. 8 and 9 of a mandrel 21, constructed as described with reference to Figs. 8 and 9, with a segment of a ring or sleeve sliding on each of its inclined faces; but each segment is formed of an outer part or parts 68 and an inner part 63, which is recessed at 65 and has an inclined portion 63ª, with rib 64 sliding in a groove 62. The part 63 is formed with an outer face that is parallel to the axis of the mandrel and has formed in it a dovetail groove 69, in which fits a corresponding rib 70, formed upon each of the outer parts 68. The grooves 69 in those faces of the several parts 63 that are in a common plane are in line, so that the parts 68 can slide endwise of the mandrel from the one part 63 onto that juxtaposed to it. Each part 68 is formed with a peripheral rib 71, which in the example is at one end of the said part. These ribs enter the internal hollows of the outward projections formed in the furnace-tube wall by the preliminary application—for instance, by rolling—of pressure in directions normal or radial to it axis at certain parts of its length, and during the application of end pressure to the furnace-tube, as previously described, for the purpose of shortening it by reducing the pitch of the hollow projections, so as to impart to them a sharper longitudinal section, determines the extent to which the side walls of the hollow projections can be thus caused to approach each other. 72 represents springs interposed between the several ring-segments 63, as shown. In each case the ring 33 is formed and arranged in a similar manner to the rings 63, and the ring 37 is formed with a rectangular bore that fits a correspondingly-formed part of the mandrel 21. The apparatus may be modified. For instance, instead of one end of the furnace-tube resting against an abutment that is stationary during the operation of the apparatus end pressure may be applied at both ends by rams or the like, which approach each other while acting on the furnace-tube. It is to be understood that various parts of the apparatus may be actuated by mechanical means, such as screw-and-worm gear, instead of by hydraulic rams. In some cases an arrangement comprising hydraulic rams and screw-and-worm gear may be employed; also, the parts of the cylindrical die-casing may be fastened together by other means than those illustrated.

The cylinder may be made for standard sizes to obviate the use of the same built up of loose pieces. For some sections it may be necessary to use outside and inside molding-rings and for others outside rings or inside rings only. In the former case such rings would be made to fit the mandrel, or a special mandrel, which may be made in one piece or in sections, so as to be collapsible, whose periphery corresponds to the sections required, could be used. The rings instead of being made separately for each corrugation may be made in one piece large enough to go over several corrugations, so that only a limited number—say two, three, or more—might be used for any given length of furnace either internally or externally.

Among the many forms of furnaces for the production of which my invention may be employed I may mention such as are constructed according to the invention of Ernest Gearing, which forms the subject-matter of an application for Letters Patent deposited by him the same day as my present application.

According to his invention the furnace-wall is of a form which, as seen in longitudinal section, comprises outwardly-projecting portions, each of which portions comprises two side walls so formed that they are nearest to one another at some point intermediate between the outer part of the outwardly-projecting portion—viz., that part which is of largest diameter—and the innermost part—viz., that which is of the smallest diameter. I call my said outward projections (which may be made in a variety of forms) "bulb-like" projections.

The intervening portions of the furnace-wall as seen in longitudinal section may be either straight or curved.

The adaptation of my invention to the production of furnaces according to Gearing's invention will be understood from the following brief explanation, which is given merely by way of example, since the details will naturally vary according to the necessities of the particular case.

In Fig. 13, A indicates in section a piece of a corrugated tube. 36 and 36ª are rings made in segments, so that they can be got in and out of place, and 36ᵇ are other rings, wedge-like in section and also made in segments. 1 is the surrounding casing or equivalent, as hereinbefore described. 35 35 are other rings, also made in segments and which constitute parts of a collapsible mandrel, as hereinbefore described.

Fig. 14 illustrates the effect upon the tube A of the application to the rings of pressure in the direction of the length of the furnace.

Of course the formation produced will depend upon the forms of the die-rings.

In conclusion, while reserving to myself the right to vary the forms, proportions, arrangements of parts, and other details as circumstances may render desirable in carrying out my invention, I desire to have it understood that

What I claim, and desire to secure by Letters Patent, is—

1. Apparatus for completing the production of a furnace tube or flue with pronounced circumferential ridges or curves in its wall, consisting of, in combination, a mandrel adapted to enter into and to be withdrawn from the interior of a flue or tube; segmental rings adapted to be disposed about the exterior of the flue or tube; retaining mechanism for securing the circumferential continuity of the ring-segments under pressure, with freedom of lateral movement; and pressing mechanism for causing the said rings to be moved in the direction of the length of the flue or tube.

2. In apparatus for the production of a furnace flue or tube of the kind referred to, the combination of, segmental rings adapted to entirely embrace the periphery of the circumferential ridges, and to be disposed about the exterior of a furnace tube or flue, of appropriate forms when closed up, as regards their inner faces, to determine the ultimate form of the pronounced circumferential ridges or curves of the said flue or tube; retaining mechanism for securing the circumferential continuity of the ring-segments under pressure with freedom of lateral movement; an internal rigid support within the flue or tube to prevent internal deformation; and pressing mechanism for causing the said rings to be moved in the direction of the length of the flue or tube.

3. In apparatus for the production of a furnace flue or tube of the kind referred to, the combination of segmental rings adapted to be disposed about the exterior of the flue or tube; retaining mechanism for securing their circumferential continuity under pressure with freedom of lateral movement; an internal mandrel adapted to expand and collapse; segmental rings exterior to such mandrel, adapted to enter into the interior of the circumferential ridges or curves of the flue or tube, and to have free lateral movement toward one another upon the said mandrel; and pressing mechanism for causing the said rings to be moved in the direction of the length of the flue or tube.

4. In apparatus for the production of a furnace flue or tube of the kind referred to, the combination of compound overlapping segmental rings adapted to entirely embrace the outer periphery of the circumferential ridges, and be disposed about the exterior of the furnace tube or flue, of appropriate forms as regards their inner faces to determine the ultimate form of the pronounced circumferential ridges of curves of the said flue or tube; supports, other than the said flue or tube for holding the said segmental rings in place, with freedom of lateral movement; retaining mechanism for securing the circumferential continuity of the ring-segments under pressure with freedom of lateral movement; an internal rigid mandrel or support within the furnace to prevent internal deformation; and pressing mechanism for causing the said rings to be moved in the direction of the length of the flue or tube.

5. In apparatus for the production of a furnace flue or tube of the kind referred to, the combination of segmental rings, adapted to be disposed about the exterior of the furnace tube or flue, of appropriate forms as regards their inner faces, to determine the ultimate form of the pronounced circumferential ridges or curves of the said flue or tube; supports, other than the flue or tube, to hold the said segmental rings in place, with freedom of lateral movement; springs between the adjoining faces of said segmental rings; retaining mechanism for securing circumferential continuity of the ring-segments under pressure, with freedom of lateral movement; an internal rigid support within the furnace to prevent internal deformation, and pressing mechanism, for causing the said rings to be moved in the direction of the length of the flue or tube.

6. In apparatus for the production of a furnace flue or tube of the kind referred to, the combination of compound segmental rings, the parts of which are adapted to slide relatively in a lateral direction, and which rings are adapted to be disposed about the exterior of the flue or tube, and are of appropriate forms as regards their adjoining and inner faces to determine the ultimate form of the pronounced circumferential ridges or curves of the said flue or tube; an intermediate packing-piece between the compound sliding segmental rings; supports other than the final flue or tube to hold the said segmental rings and packing-pieces in place, with freedom of lateral movement; retaining mechanism for securing circumferential continuity of the ring-segments under pressure, with freedom of lateral movements; an internal support within the flue or tube and pressing mechanism for causing the said rings to be moved in the direction of the length of the flue or tube.

7. In apparatus for the production of a furnace flue or tube of the kind referred to, the combination of compound segmental rings, the parts of which are adapted to slide relatively in a lateral direction, and which rings are adapted to be disposed about the exterior of the flue or tube and are of appropriate form as regards their adjoining and inner faces to determine the ultimate form of the pronounced circumferential ridges or curves of the said flue or tube; an intermediate packing-piece of wedge-like section between the compound sliding segmental rings; supports other than the flue or tube to hold the said segmental rings and packing-pieces in place, with freedom of lateral movement; retaining mechanism for securing circumferential continuity of the ring-segments under pressure with freedom of lateral movement; an internal support within the flue or tube; and pressing mechanism for causing the said rings to be moved in the direction of the length of the flue or tube.

8. In apparatus for the production of a furnace flue or tube of the kind referred to, the combination of compound segmental rings the parts of which are adapted to slide relatively in a lateral direction, and which rings are adapted to be disposed about the exterior of the flue or tube, and are of appropriate forms as regards their adjoining and inner faces to determine the ultimate form of the pronounced circumferential ridges or curves of the said flue or tube; an intermediate packing-piece of wedge-like section between the compound sliding segmental rings; supports other than the flue or tube to hold segmental rings and packing-pieces in place with freedom of lateral movement, retaining mechanism for securing circumferential continuity of the ring-segments under pressure; a mandrel internal to the flue or tube adapted to expand and collapse; segmental rings exterior to such mandrel adapted to enter into the interior of the circumferential ridges or curves of the flue or tube and to have free lateral movement toward one another upon the said mandrel; and pressing mechanism for causing the said rings to be moved in the direction of the length of the flue or tube.

9. In apparatus for the production of a furnace flue or tube of the kind referred to, the combination of compound segmental rings having parts sliding one under the other, adapted to be disposed about the exterior of the flue or tube; a divided cylindrical casing inclosing the said segmental rings, insuring their circumferential continuity under pressure, with freedom of lateral movement; means for retiring and advancing parts of said divided casing by a sliding movement from and toward one another; an internal rigid support within the flue or tube; and pressing mechanism for causing said rings to be moved in the direction of the length of the flue or tube.

10. In apparatus for the production of a furnace flue or tube of the kind referred to, the combination of segmental rings adapted to be disposed about the exterior of the furnace; a divided cylindrical casing inclosing the said segmental rings, insuring their circumferential continuity under pressure with freedom of lateral movement; means for retiring and advancing parts of said divided casing by sliding, from, and toward one another; locking-catches at both sides of the division securing the parts of the casing together; an internal rigid support within the furnace; and pressing mechanism for causing the said rings to be moved in the direction of the length of the flue or tube.

11. In apparatus for the production of a furnace flue or tube of the kind referred to, the combination of segmental rings adapted to be disposed about the exterior of a vertical flue or tube; supporting mechanism for carrying the said segments within the walls of each part of a divided vertical internally-cylindrical casing; springs between the adjoining rings; means for retiring and advancing the parts of the said divided casing from and toward one another; a locking-catch securing the parts of said casing together to retain said segmental rings in circumferential continuity under pressure; an internal support within the flue or tube, and pressing mechanism for causing the said rings to be moved in the direction of the length of the flue or tube.

12. In apparatus for the production of a furnace flue or tube of the kind referred to, the combination of segmental rings adapted to be disposed about the exterior of the flue or tube; a divided internally-cylindrical casing inclosing the said segmental rings, insuring their circumferential continuity under pressure, with freedom of lateral movement; means for retiring and advancing parts of the said divided casing from, and toward, one another; a central stop-block in the path of the divided parts of the casing, determining the coincidence of the axes of the casing and the flue or tube; a locking-catch securing the parts of the casing together; an internal support within the furnace; and pressing mechanism for causing the said rings to be moved in the direction of the length of the flue or tube.

13. In apparatus for the production of a furnace flue or tube of the kind referred to, the combination of segmental rings adapted to be disposed about the exterior of the flue or tube; retaining mechanism for securing the circumferential continuity of the said segmental rings under pressure, with lateral freedom of movement; an internal mandrel adapted to enter into and retire from the interior of the flue or tube; hydraulic rams operating the said mandrel; and hydraulic rams causing the said rings to be laterally closed together in the direction of the length of the flue or tube.

14. In apparatus for the production of a furnace flue or tube of the kind referred to, the combination of segmental rings adapted to be disposed about the exterior of the flue or tube; a divided internally-cylindrical casing inclosing the said segmental rings, insuring their circumferential continuity under pressure; hydraulic rams retiring and advancing the parts of said divided casing from and toward one another; a central stop-block in the path of the divided parts of the casing determining the coincidence of the axes of the casing and the flue or tube; a locking-catch securing the parts of the casing together; and pressing mechanism causing the said rings to be laterally closed together in the direction of the length of the flue or tube.

15. In apparatus for the production of a furnace flue or tube of the kind referred to, the combination of segmental rings adapted to be disposed over the exterior of the flue or tube; means for maintaining their circumferential continuity under pressure; a fixed standard having projecting bars adapted to support or hold the said segmental rings in their place; a mandrel sliding on the bed-plate of the said standard and carrying a hydraulic cylinder; a fixed piston within the said hydraulic cylinder, operating the hydraulic cylinder and mandrel either way through the said standard, so as to enter and retire from the interior of the flue or tube; and a fixed hydraulic ram, having supplementary return-rams, attached to and situated so as to face the said fixed standard, adapted to move the said rings in the direction of the length of the flue or tube.

16. In apparatus for the production of a furnace flue or tube of the kind referred to, the combination of segmental rings adapted to be disposed over the exterior of a flue or tube having appropriate inner surfaces to form the required circumferential ridges; segmental collars adapted to the exterior of the plain ends of the furnace; means for maintaining their circumferential continuity under pressure; a mandrel adapted to enter into and retire from the interior of the flue or tube; plain collars at either end of the mandrel adapted to enter and fit within the plain ends of the flue or tube; rings on the said mandrel between the end collars; hydraulic mechanism for entering and retiring the mandrel; a ramhead admitting the end of the mandrel, and having hydraulic-pressure mechanism to move the said rings in the direction of the length of the flue or tube.

17. In apparatus for the production of a furnace flue or tube of the kind referred to, the combination of segmental rings adapted to be disposed over the exterior of the flue or tube; segmental collars adapted to fit the exterior of the plain ends of the flue or tube; a divided internally-cylindrical casing, inclosing the said segmental rings and collars; headed bolts pivoted on tension-rods on one part of the casing engaging with slotted lugs on the other part; eccentrics on shafts operating the said tension-rods; and hand-moved worm-gear to the said shafts to operate the eccentrics, as means for locking the said parts of the casing together.

18. In apparatus for the production of a furnace flue or tube of the kind referred to, the combination of segmental rings adapted to be disposed over the exterior of a flue or tube; an expandible and collapsible mandrel internal to the said flue or tube; a core in the said mandrel adapted to move longitudinally to shoes divided longitudinally; toggle-levers pivoted to the said core and the said shoes to maintain parallelism; segmental rings connected to, and adapted to slide longitudinally to the said shoes; and means for moving the said core longitudinally to the said shoes, to enlarge or reduce the diameter of the said mandrel.

In witness whereof I have hereunto set my hand in presence of two witnesses.

WILLIAM RAINFORTH.

Witnesses:
WILLIAM JOHNSTON,
HARRY SIDNEY HEPWORTH.